(No Model.)
E. A. LUZENBERG & E. SACHS.
STAMP CANCELER.
No. 341,425. Patented May 4, 1886.
*Fig. 1.*
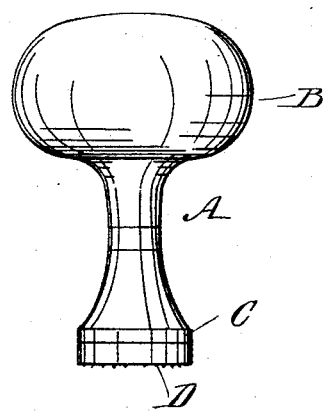
*Fig. 2.*  *Fig. 3.*
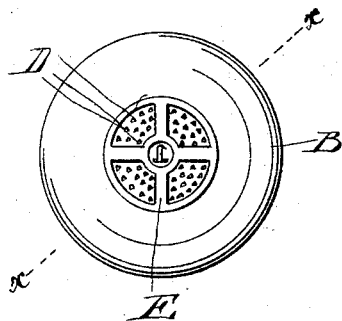 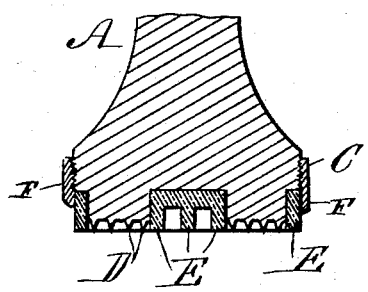
*Fig. 4.*
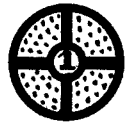
WITNESSES:
Theo. G. Hoster
E. M. Clark
INVENTOR:
E. A. Luzenberg
E. Sachs
BY Munn & Co.
ATTORNEYS.

UNITED STATES PATENT OFFICE.

EDWARD A. LUZENBERG AND EDWARD SACHS, OF SAN ANTONIO, TEXAS.

STAMP-CANCELER.

SPECIFICATION forming part of Letters Patent No. 341,425, dated May 4, 1886.

Application filed September 22, 1885. Serial No. 177,821. (No model.)

*To all whom it may concern:*

Be it known that we, EDWARD A. LUZENBERG and EDWARD SACHS, of San Antonio, Bexar county, Texas, have invented a new and Improved Stamp-Canceler, of which the following is a full, clear, and exact description.

The object of our invention is to provide a new and improved stamp-canceler, which is so constructed that it punctures or perforates the stamp and inks it at the same time, but does not mutilate the letter or other contents of the envelope.

The invention consists in parts and details and combinations of the same, as will be fully described hereinafter.

Reference is to be had to the accompanying drawings, forming part of this specification, in which similar letters of reference indicate corresponding parts in all the figures.

Figure 1 is a side view of our improved stamp-canceler. Fig. 2 is a bottom end view of the same. Fig. 3 is an enlarged cross-sectional view of the same on the line $x\ x$, Fig. 2. Fig. 4 is a view of the impression made by the canceler.

The stock or handle A is provided with the knob B, and on the lower end of the stock a metal plate, C, is secured, from the surfaces of which project short sharp-pointed teeth D, having polygonal or circular cross-section—that is, they are either small cones or pyramids. In the surface of the plate radial and circular grooves are cut for receiving a piece of rubber, E, shaped to fit in said grooves, a numeral or other mark being preferably formed in the center of said rubber. The rubber is securely fastened in the grooves in such manner that the bottom face of the rubber is almost flush with the points of the teeth D. A metal ring, F, is passed around the lower part of the stock or handle A and the rubber E, for the purpose of holding the same firmly in position. The face of the canceler is inked in the usual manner by pressing it on an inking-pad, and then a blow having more or less force is delivered with the face of the canceler on the stamp. The rubber part of the canceler makes an impression and the teeth are forced into the stamp and make small holes in the same, which are also filled with ink, thus making the stamp absolutely worthless. The points of the teeth being almost flush with the rubber part, the teeth cannot pass very far into the stamps, as the rubber does not give sufficiently. There is thus no danger of mutilating or damaging the contents of the envelope or package.

The rubber part may be of any desired design, and the teeth may be arranged in any desired manner.

Having thus described our invention, we claim as new and desire to secure by Letters Patent—

The hand-stamp canceler comprising the handle having affixed to its lower end the plate constructed with an outer and an inner circular chamber or channel, and a series of radial narrow chambers or channels connecting the said circular channels or chambers, and with series or groups of teeth arranged intermediately of said channels or chambers, said channels or chambers being provided with elastic ink-markers with their outer surfaces arranged almost flush with the points of the teeth, substantially as and for the purpose set forth.

EDWARD A. LUZENBERG.
EDWARD SACHS.

Witnesses:
SAM NEWMAN,
HERBERT FORK.